United States Patent [19]

Klaschka

[11] Patent Number: 4,513,873
[45] Date of Patent: Apr. 30, 1985

[54] CAPACITOR CAN HOUSING, PROCESS AND APPARATUS FOR ITS MANUFACTURE

[76] Inventor: Rudolf Klaschka, 7896 Wutoeschingen 3, Fed. Rep. of Germany

[21] Appl. No.: 402,445

[22] Filed: Jul. 27, 1982

[30] Foreign Application Priority Data

Sep. 28, 1981 [DE]  Fed. Rep. of Germany ....... 3138519
Jan. 22, 1982 [DE]  Fed. Rep. of Germany ....... 3201963

[51] Int. Cl.³ ............................................. B65D 51/16
[52] U.S. Cl. ................................... 220/89 A; 220/207
[58] Field of Search ............. 220/207, 89 A, 268; 137/68 R; 222/397; 72/467, 343; 413/15, 17; 29/DIG. 11

[56] References Cited

U.S. PATENT DOCUMENTS

| | | | |
|---|---|---|---|
| 2,726,002 | 12/1955 | Dalianis | 220/89 A X |
| 3,244,316 | 5/1966 | Atkinson et al. | 220/89 A |
| 3,292,826 | 12/1966 | Abplanalp | 220/89 A |
| 3,338,199 | 8/1967 | Taylor | 417/17 X |
| 3,622,051 | 11/1971 | Benson | 220/89 A X |
| 3,669,302 | 6/1972 | Markarian | 220/207 |
| 3,815,534 | 6/1974 | Kneusal | 220/207 X |
| 3,893,326 | 7/1975 | Oberlander et al. | 72/467 X |
| 3,902,627 | 9/1975 | Gane | 220/268 |
| 4,003,505 | 1/1977 | Hardt | 222/397 |
| 4,038,859 | 8/1977 | Pauleszek | 72/467 X |
| 4,219,126 | 8/1980 | Oana | 220/89 A |
| 4,348,464 | 9/1982 | Khoury | 413/17 X |

*Primary Examiner*—Stephen Marcus
*Assistant Examiner*—Robert Petrik
*Attorney, Agent, or Firm*—Jordan and Hamburg

[57] ABSTRACT

A capacitor can housing of a ductile material is provided with a predetermined burst spot for excess pressure exceeding the working pressure. The can housing is provided with a wall weakening area formed at a deep draw area to define the burst spot and is formed by a deep drawing process which forms a groove disposed in at least one side but not penetrating the can wall. A corresponding device has a holding mandrel provided with a groove and an outside groove die, whereby the dies function as deep draw dies to form the burst spot.

1 Claim, 13 Drawing Figures

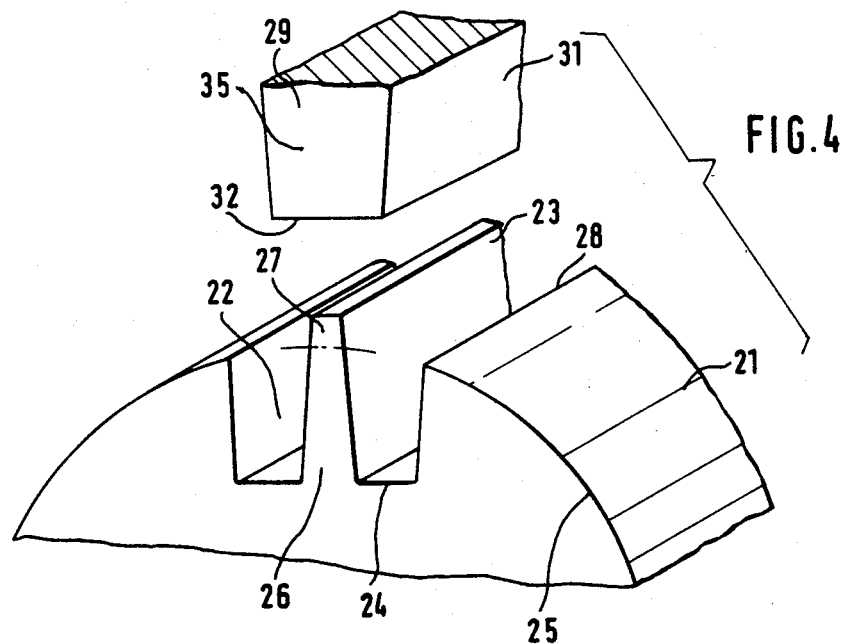
FIG. 4
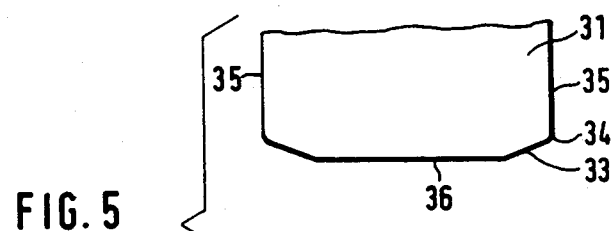
FIG. 5
FIG. 6
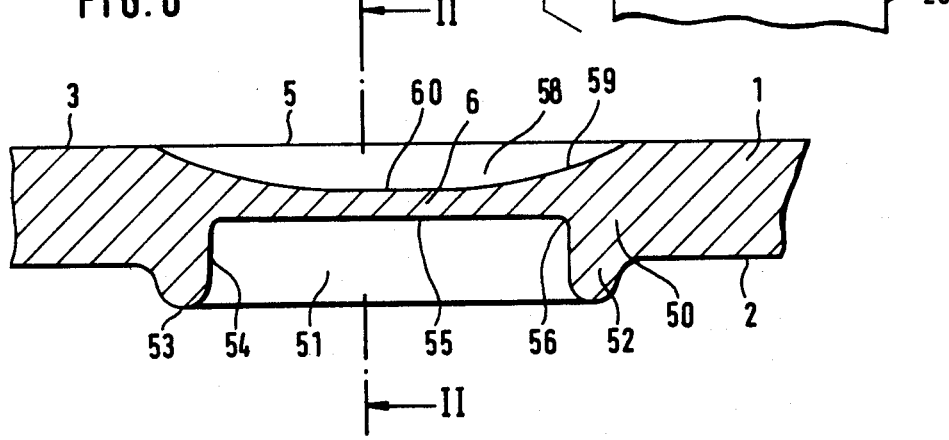

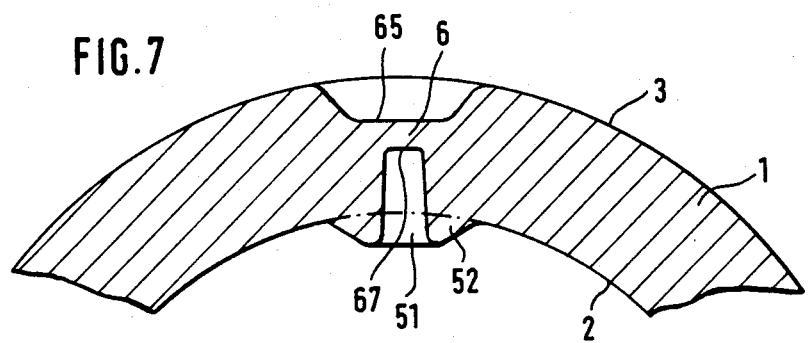
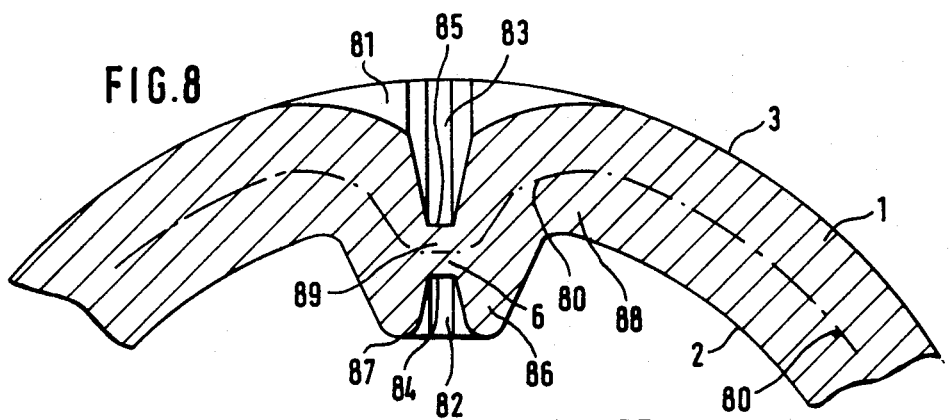
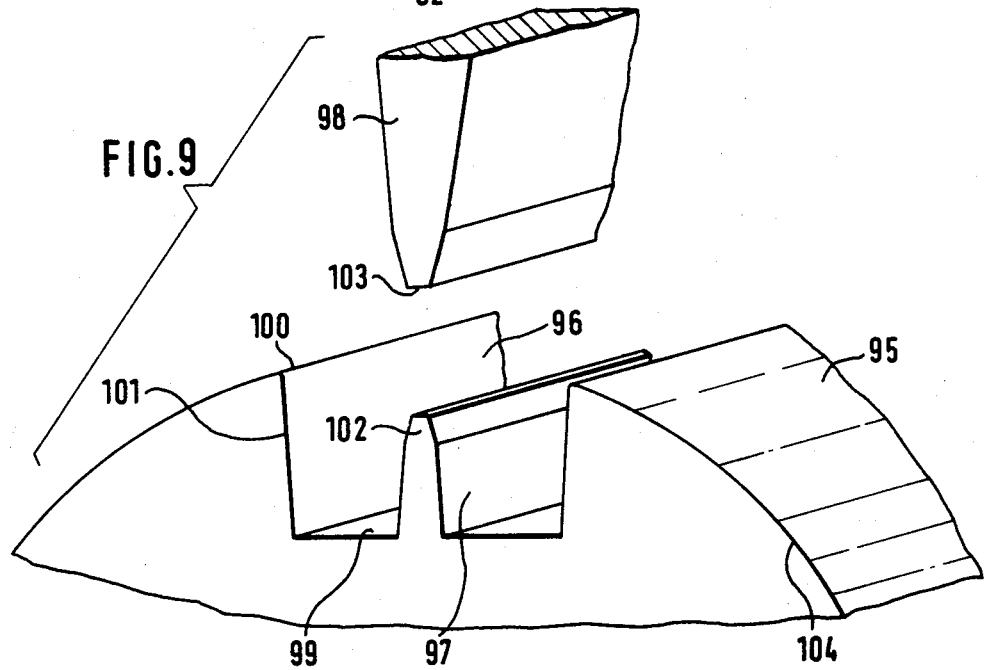

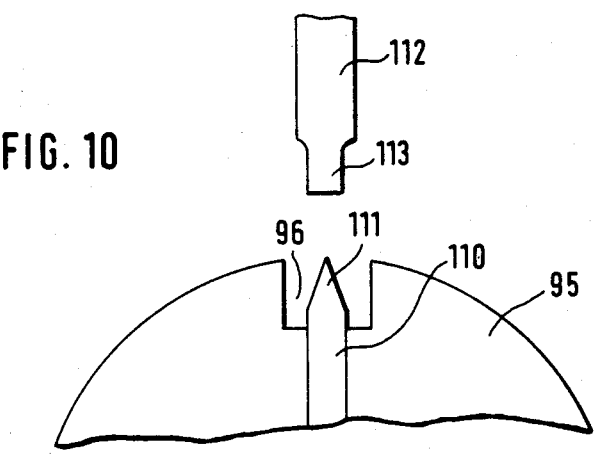
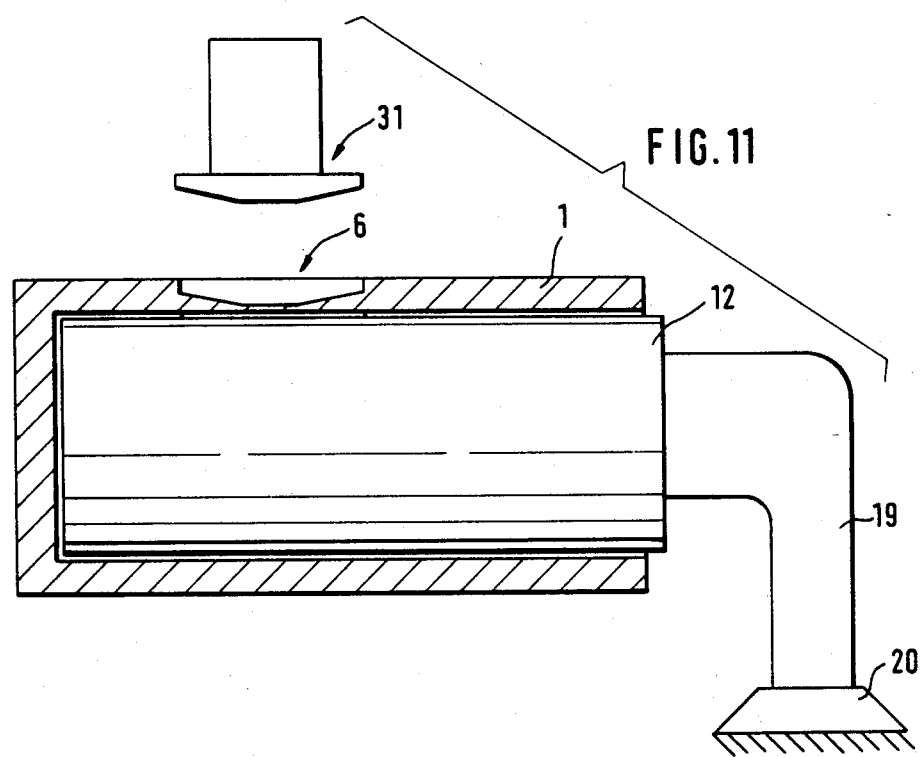

CAPACITOR CAN HOUSING, PROCESS AND APPARATUS FOR ITS MANUFACTURE

BACKGROUND OF THE INVENTION

This invention relates to a capacitor can housing as well as a method for the production of a capacitor can housing and apparatus for the execution of this process.

The term "capacitor can housing" or herebelow also the shorter term "can housing" includes not only regularly cylindrical capacitor or condensor can housings that are closed on one end, but also can housings open at both ends as well as housings with other than round cross sections.

The provision of a predetermined burst spot on the can housing which is designed to open the can housing by tearing open when the capacitor is overloaded and critical overpressure results within the closed capacitor housing is a safety precaution and thereby prevents the capacitor from bursting explosively or that its closing cover be thrown like a projectile out of its anchoring in the closed can housing.

The predetermined burst spot, resulting from a weakening of the wall, must be disposed in such a manner that the weakest remaining wall thickness still suffices to guarantee absolute imperviousness and resistance to permeation of the can housing up to the required critical pressure threshold.

The preparation of a groove-like weakening of the wall causes, due to the stamping process used, a displacement of material which is raised like a wall, a protrusion or a burr at both sides of the groove produced. Protrusion heights of approximately 0.1 to 0.3 mm at a diameter of the can housing of 6 to 8 cm causes difficulties, particularly in production lines for capacitors. An added step of finishing for cutting-off or grinding-off such protrusions increases unproportionally the price of mass-produced capacitors.

In order to prevent a second step of manufacturing, it was possible to press the capacitor can housing upon a profile-complementary, almost accurately fitting holding mandrel and to form from the outside a wall weakening by means of a stamp device. In that case, the region of the holding mandrel, situated opposite to the stamp device, may be formed as a flat surface region while in all other regions the inner wall of the can housing must abut the holding mandrel exactly and form fitting.

While pressing in the stamp device at first, a bending deformation of the can wall results. This bending deformation is stopped by abutting the inner wall of the can housing to the flattened surface of the holding mandrel. When the stamp edge sinks in further, stamping of the groove results, in other words, the stamping results while the material of the can wall flows. Accordingly, the stamping protrusion or burrs at both sides of the stamped groove are inevitably raised. Due to the deformation of the can wall before stamping, the protrusions or burrs will not protrude over the outer circumferential circle of the can housing but will lie within this boundary. The flattening of the holding mandrel will be chosen at such a measure that the highest elevations of the protrusion or burr lie closely within the highest or upon the outer circumferential circle of the can wall. At a mean burr height of about 0.1 mm, the planar flattening of the holding mandrel will also amount to 0.1 mm or not much above that. For the manufacture of cylindrical can housings out of aluminum at diameters up to about 10 cm, the surface of the planar flattening of the otherwise cylindrical holding mandrel lies preferably 0.05 to 0.5 mm below the vertex of the imaginary superficies of the holding mandrel.

In this example, the planar flattening of the holding mandrel extends its longitudinal extension parallel to the longitudinal axis of the holding mandrel. The longitudinal axis of the flattening, the stamping device and the longitudinal axis of the holding mandrel are preferentially aligned parallel to each other. Thereby the groove-like weakening of the wall runs parallel to the longitudinal axis of the can housing. The flattened surface area in this embodiment may be as well formed along the whole axial length of the holding mandrel as also only along the length of the stamping area.

In the aforedescribed example, protrusions form on the one hand, at the weakening of the wall and, on the other hand, flow of the material in the region of the wall weakening causes deformation stresses and deformation hardening so that the predetermined bursting spot is reduced to a very low wall thickness, for instance to the region between 0.06 and 0.08 mm. Another disadvantageous aspect is that the effect of pressure results in the outwardly arched regions of the area deformed by bending and not at the desired predetermined bursting spot.

Thus an object of the present invention is to provide a capacitor can housing having a greater remaining wall thickness at the predetermined burst spot while considerably avoiding outer bulges of material and deformation hardening in the area of the predetermined burst spot. A process for the fabrication and an apparatus for the execution of this process is also disclosed.

For the prevention of outer material bulges and a large flow of material while fabricating, which leads to work hardening in this area, the predetermined burst spot is provided, according to the present invention, at a deep drawing area of the capacitor can housing. The can wall, deep drawn in the area provided for the predetermined burst spot, is furnished with at least one axially running groove-like indentation. The weakening of the strength of the can-wall caused by deep drawing is slightly equalized by the production of the groove-like indentation. That process prevents the disadvantageous hardening processes caused mainly by cold flow of the material. This makes it possible to plan the remaining thickness of the wall of the predetermined burst spot thicker than heretofore possible. Preferably the remaining thickness of the wall of about 0.12 to 0.13 mm is obtained while in capacitor can housing manufactured according to previous processes, a remaining wall thickness of about 0.06 to 0.08 mm was needed for a triggering or bursting pressure of $14\pm2$ bar. This increase of the remaining thickness of the wall at the predetermined bursting spot by almost a factor of 2 improves thereby the permeability strength of the can housing and offers on the other hand, a greater safety in regard to the technique of manufacturing, particularly in the automatic steps of processing in mass production.

Compared to the aforedescribed capacitor can housing, the can housing according to the invention has a relatively narrowly defined, precise area for the weakening of the wall and the predetermined burst spot, resulting from the deep drawing in a relatively narrow groove. By substantially preventing work hardening and hardening due to deformation in the deep drawn can housing, the predetermined burst spot is really also the area of minimum wall thickness so that bursting by excess pressure occurs for safety reasons only at the planned spot, in other words at the predetermined burst spot.

This kind of a predetermined burst spot may be realized advantageously in can housings of capacitors having for instance outer diameters of 12, 25 or 35 to 40 mm, and corresponding wall thicknesses of 0.35, 0.40 or 0.45 mm, respectively. The convex shaping of the outer wall of the predetermined burst spot and the approximately straight form of the inner wall have the advantage that these can housings may be pushed on or pulled off, respectively, a holding mandrel under conditions of mass production. It is additively supportive for easier handling in manufacturing processes to allow a play of about 1 mm between the diameter of the holding mandrel at the outer diameter of about 12 mm for the can housing. The deep drawing of about 0.3 mm relative to the normal inner circumferential radius of the can housing is in that case without deleterious influence upon the subsequent introduction of capacitor windings into the interior of the can housing.

The bilateral forming of an indentation in the can wall, in other words as well inside as outside, succeeds in making the predetermined burst spot lying approximately in the neutral central plane of the can wall even after the deep drawing process. The shaping of the can housing with two groove-like indentations of approximately equal width is particularly conducive for this embodiment. Here the bottom of the inner indentation lies advantageously within the inner radius of the circumferential wall of the can in which case a radius, smaller by about 0.15 mm, is particularly appropriate in this embodiment.

In another preferred embodiment, the inner indentation protrudes over the circumferential circle of the inner wall of the can housing radially outwardly, in which case it is desirable to use a radius larger by about 0.1 mm than the inner radius. In this embodiment, an indentation wider than the inner indentation is provided in the outer side of the can wall. The breadth of the deep drawn region of the can housing may advantageously amount to 1.5 mm at the inner circumference while the inner bulge protrudes due to deep drawing about 0.3 mm into the interior of the can housing.

The forming of the can housing in such a manner provides that in its final stage, the center of the wall thickness of the predetermined burst spot lies after deep drawing approximately in the center of the neutral center plane of the can wall and prevents or equalizes influences arising from a greater material hardness in the edge area of the can housing. Thus, in this embodiment, it is possible to determine relatively exactly the remaining wall strength or thickness of the predetermined burst spot dependent on the predetermined bursting pressure and also to put it in practice by following tried manufacturing methods.

The process of manufacturing the aforementioned capacitor can housing includes pushing the can housing onto a holding mandrel and then deep drawing the housing wall in the area of the predetermined burst spot to form a groove on at least one housing wall side in the deep drawn area. The bursting of a capacitor can housing prepared by this method within the remaining wall strength occurs approximately in such a manner that a tearing apart of the predetermined burst spot by a corresponding critical tensile stress occurs at the threshold pressure. Manufacture according to tried methods of the can housing by using a holding mandrel is facilitated by the fact that the generally deep drawn can housing has in the axial walls draw flutes in the region of about 10 to 15% of the wall strength.

A device for execution of the process includes a substantially cylindrical holding mandrel serving as the inner die against an outer die, acting from the outside. The holding mandrel is furnished with a groove which may reach as well along the whole length as also only along a part of the axial length of the holding mandrel, and which now corresponds to the position and the length of the wall weakening provided for the predetermined burst spot. The groove is preferably U-shaped, in which case a groove-breadth of about 1.5 mm and a groove height from groove bottom to groove rim of about 0.3 mm have been successfully used. Preferably the groove bottom is formed as an even space from which almost vertical groove walls rise up to circumferential wall of the holding mandrel. Another groove, though, may be chosen, for instance a groove provided with chamfers towards the axis of the holding mandrel.

The outer die of the device is shaped so that it has a breadth smaller than the breadth of the groove. It is possible to use, for instance, a relation of 1.5 mm breadth of the groove and 0.5 mm breadth of the outer die on the narrow side. In an axial top view of the outer die, its longitudinal profile is preferably shaped so that an obliquely running chamfer to the narrow sides is provided, the chamfer originating in a center area running approximately parallel to the axis of the holding mandrel. The central area has a length of approximately 4 mm and the areas of the chamfer amount to approximately 0.1 mm. The angle between the extension of the median area, for instance, and the chamfer may amount to 30° to 45°. The transition into the narrow side is provided by a chamfer having a radius of about 0.05 mm. The chamfer has the advantage that punctures due to deep drawing are avoided, thereby diminishing the safety of the predetermined burst stop. The head of the outer die is approximately trapezoidally-shaped in its narrow side profile when it is formed as a groove die.

The groove has preferably a preferentially centrally disposed groove die, which may be provided as well over the whole length of the groove as only in the area of the predestined burst spot to be formed. While the outer die has bent rim areas which are in their final effect responsible for the convex configuration of the outer wall of the predetermined burst spot, the groove die, acting from inside, is shaped in a straight line over its whole length and verges with a very small chamfer into the narrow sides.

Although the device is equipped with a groove die, protruding radially above the circumferential circle of the holding mandrel, it is possible to choose preferably a groove die with a wedge point, the die being shorter and lying below the circumferential circle where, in the last mentioned embodiment, the forming of the outer die as a groove die results in additional advantages. The inner groove die has advantageously a height of about 0.1 mm, measured from the groove bottom, at a whole groove height of 0.3 mm. A height slightly below the groove height may also be chosen.

The use of two oppositely acting groove dies and a corresponding construction of the groove results in extremely advantageous remaining strengths and thicknesses of the predetermined burst spot. The predetermined burst spot lies, when using this method of fabrication, approximately in the region of the neutral center space of the can wall so that an easily adjusted remaining wall strength may be obtained, substantially without deformation hardening and without fluctuations of wall strengths caused by deep drawing flutes.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope or range of equivalents of the claims.

The construction and operation of the invention, however, together with additional objects and advantages thereof will be best understood from the following description of specific embodiments when read in connection with the accompanying drawings.

BRIEF DESCRIPTION OF THE DRAWINGS

FIG. 4 is a perspective view of another embodiment of a holding mandrel showing a part of the holding mandrel in the area of the groove and an outer die guided against the groove for deep drawing.

FIG. 5 is a profile in axial top view of an embodiment of an outer die and a groove die.

FIG. 6 is an axial sectional view of a part of the housing wall with respective predetermined burst spot and which was prepared by the device according to FIG. 4.

FIG. 7 is a radial sectional view of the predetermined burst spot taken along the line II—II in FIG. 6.

FIG. 8 is a radial sectional view in the area of the predetermined burst spot similar to the embodiment according to FIG. 7, but prepared by a device according to FIG. 9.

FIG. 9 is a perspective view of a part of another embodiment of a holding mandrel with the outer die directed against the groove for the fabrication of a predetermined burst spot according to FIG. 8.

FIG. 10 is a partial axial sectional view of another holding mandrel with a changed groove die.

FIG. 11 is a schematic view of the whole device including a sectional view of a can housing.

DESCRIPTION OF THE PREFERRED EMBODIMENTS

Figure 1:
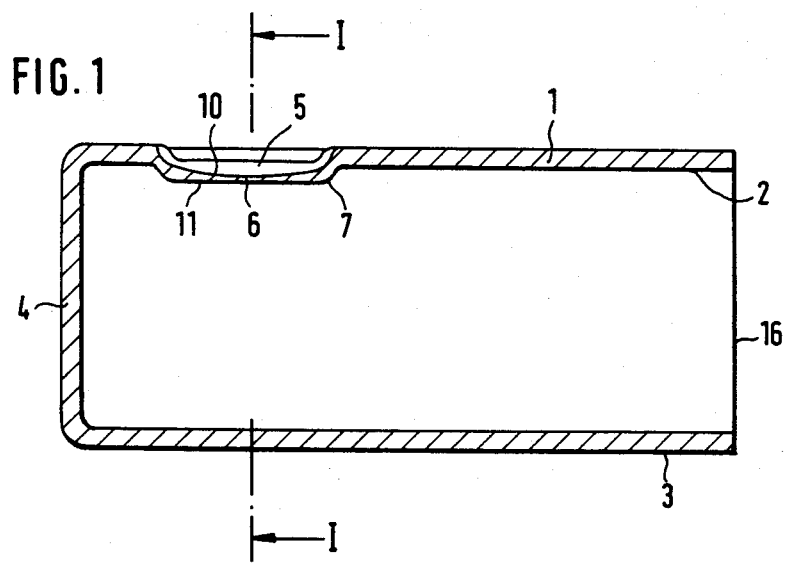
FIG. 1 is an axial cross sectional view of a capacitor housing taken through a predetermined burst spot.

FIG. 1 is an axial sectional view of a capacitor can housing with the cutting plane passing through the area of a predetermined burst spot 6. The can housing 1 preferably is made of aluminum and has an integrally formed bottom 4 formed by a deep drawing process. The can housing 1 may, for example, have a diameter of about 12 mm, in which case the wall thickness between inner wall 2 and outer wall 3 is about 0.35 mm. In the embodiment according to FIG. 1, the can housing has an elongated cylindrical shape. In the top of the can wall as shown in FIG. 1, there is formed an area 5 of deep drawing which extends a distance from the bottom 4 in an axial direction relative to the axis of the can housing, the area 5 being a deep drawn weakening of the wall. The deep drawn area 5 begins at a distance from the bottom 4 which is easily managed by the present state of the deep drawing art and may amount to 2 to 3 mm. The area of deep drawing for weakening of the wall may also be provided in FIG. 1 axially transposed towards can opening 16.

The area of deep drawing 5 extends, in the embodiment according to FIG. 1, over a length of about 5 to 7 mm. The radial depth of the area of deep drawing 5 between the inner wall of can housing 1 and inner wall 11 of the predetermined burst spot 6 is about 0.3 mm. The predetermined burst spot 6 itself, which is provided preferably in the middle of the axial wall weakening, has about 0.12 to 0.13 mm residual wall thickness, in which case bursting strength lies in the region between 14±2 bar.

According to FIG. 1, the wall weakening is formed so that the inner wall 11 of the predetermined burst spot 6 is a straight line and extends parallel to the axis of can housing 1. The profile, pressed or cut in, is formed inwardly convex when seen from the outside. The outer wall 10 of the predetermined burst spot is weakest at about the axial center of the length of the wall weakening due to its minimum remaining wall thickness. The rim areas of the deep drawn region change into the normal can wall by the chambers 7. No outwardly directed bulges of material are present in this can housing. The deep draw configuration, greatly emphasized in FIG. 1 in its relation to the diameter of can housing 1, has an inner bulge of about 0.3 mm opposite the inner wall. Keeping in mind the drawing flutes of about 10 to 15% of the wall thickness that might be caused by some techniques of manufacture, the region of deep drawing 5 does not in any way impede the consecutive mounting of the capacitor per se.

Figure 2:
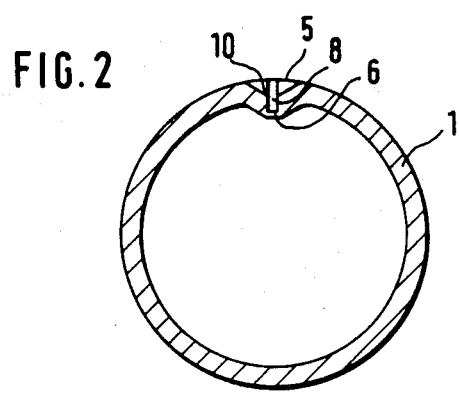
FIG. 2 is a radial cross sectional view of the housing of FIG. 1 taken along line I—I in FIG. 1.

The radial section according to FIG. 2 passes through the predetermined burst spot 6 and shows the relatively feeble imprint of the region of deep draw 5, where the breadth amounts to approximately 1.5 mm. The breadth referred to is the distance between the inner wall parts which deviates from the normal inner wall diameter of the can housing 1 inwards in an axial direction.

The profile of the wall weakening in radial section according to FIG. 2 has at first a slight approximately wedge-shaped inward bulge running from outside towards the predetermined burst spot 6 proper, the inward bulge being caused by the deep drawing process. In the middle of the deep draw region 5, there is provided for the production of the predetermined burst spot 6, a groove-indentation 8 having a substantially relatively pointed trapezoidal shape. The radial section according to FIG. 2 shows that the outer wall 10 of the predetermined burst spot forms a short straight planar region. This straight running planar region of the outer wall 10 of the predetermined burst spot is the predetermined burst spot per se and is very easily fabricated in view of the desired remaining wall strength relative to the predetermined burst pressure.

Figure 3:
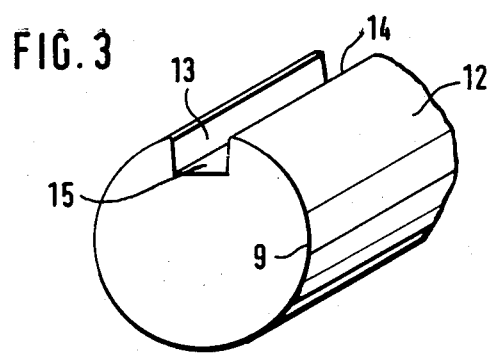
FIG. 3 is a perspective view of a part of a holding mandrel with a groove therein.

FIG. 3 shows a partial length of a holding mandrel 12. This partial piece represents as an example a piece of the whole holding mandrel 12 which, in FIG. 1, is inserted down to the bottom 4. A U-shaped groove 13 which faces upwardly is formed in the region of the holding mandrel 12 and comprises a bottom 15. This groove 13, which must run along the whole length of the holding mandrel 12, must be provided at least in the deep draw region 5 of the can housing 1.

The holding mandrel 12 is formed cylindrically with the exception of groove 13. The upper groove edges 14 pass relatively angularly into the adjacent planes or the circumferential circle 9 respectively in this embodiment. These groove edges may also be rounded off corresponding to the chosen wall thicknesses of the can housings.

FIG. 4 shows a sector of another embodiment of a holding mandrel 21. In FIG. 4, there is also shown the outer die 31 which effects the deep drawing from the top. The holding mandrel 21 is formed like holding mandrel 12 in FIG. 3, apart from the special configuration within the groove. Within the groove, there is provided in the center of the groove bottom 24 a groove die 27 that runs in the longitudinal direction of the groove 22. The groove die 27 has altogether a slight wedge shape that tapers upwardly, in other words radially outwardly. The height of the groove die 27, measured from its die base 26 at the groove bottom 24 to its head 23 is, in this embodiment, larger than the groove depth. The groove die 27 rises over the upper groove rim 28 or the circumferential circle 25 of the holding mandrel by 0.1 mm, for example.

The outer die 31, acting from above against the groove die 27 is on its narrow side 29, in other words at its head 32, wider than the head 23 of the lower groove die which protrudes over the groove. The breadth of head 32 is, for example, about 0.5 mm, while the breadth of the lower head 23 may lie in the range between about 0.1 mm and 0.2 mm.

Both dies may be formed at their head ends trapezoidally-shaped, although FIG. 4 shows as well the lower groove die 27 as also the upper outer die 31 substantially wedge-shaped, running in one plane. They may be at their ends still more tapered wedges or points, respectively.

FIG. 5 shows a lateral top view of the opposing outer die 31 and the lower groove die 27. The lower lying groove die 27 is shown in FIG. 5 as having an almost linear head plane 38 as a cutting or groove edge. The upper outer die 31, which effects the deep drawing of the can wall, is formed with chamfers 33, slightly running upwardly at the axial rims. The head 32 of outer die 31 has a linear central area 36 which may run along half of the length of the outer die. This linear middle region 36 may also be considerably shorter, in which case the length of the middle region 36 determines the predetermined burst spot, in other words the thinnest region of the wall. The transition from the chamfers 33 to the narrow sides 35 of the outer die 31 occurs thereby in the shape of a radius-transition 34.

The groove die 27, arranged underneath, is linearly formed along the whole length of the cutting edge and changes relatively angularly, preferably though with a very faint rounding 39 into the lateral narrow side.

FIGS. 6 and 7 show the profile of an axial or radial section, respectively, of a predestined burst spot of a can housing, prepared by the device according to FIGS. 4 and 5. For that purpose, a can housing of the kind shown in FIG. 1 is pushed manually or by machine onto the mandrel 21, shown in FIG. 4. The mounting upon the holding mandrel 21 may be performed easily over the circumferential circle of the holding mandrel and further, despite the slightly protruding groove die 27, because play of approximately 1 mm exists between the inner wall 2 of the can housing and the circumferential wall of the holding mandrel 21, the diameter of the can housing being about 12 mm. The can housing 1, pushed upon the holding mandrel 21 between the groove die 27 and the upper outer die 31, is deep drawn by lowering outer die 31. Thereby the relatively easily flowing aluminum of the can housing is deep drawn into the groove 22 of the holding mandrel 21 around the groove die 27. The deep drawing process brings the innermost wall region of the originally very accurately cylindrical can housing to the groove bottom 24. An outer indentation 58, as shown in FIG. 6, remains after the deep draw and groove processes on the outer side of the can housing.

Despite the protrusion by a maximum 0.3 mm of the bulges 52 of the lower groove contour 51 over the inner wall 2, the can housing may be easily stripped off the holding mandrel 21 even after deep drawing. Thus the whole can housing just need be lifted slightly, where the play of about 1 mm between the inner wall of the can housing and the holding mandrel finds good use.

The region of deep drawing 50 according to FIG. 6 has in axial section an almost rectangular lower groove contour 51 where the substantially flat middle plane 55 passes into the almost radially running side wall 54 over a corner 56 of a very small radius. Bulges 52, formed in groove 22 by deep drawing, have a rim 53 as the innermost limitation of the deep drawn region 50, the rim 53 substantially running approximately parallel to the center plane 55. The outer indentation 58 has substantially a configuration slightly rounded towards the center, in which case the lowest remaining wall strength for the predestined burst spot is normally reached in the center. The rim area 59 and the middle part 60 correlate in the configuration substantially to the profile of the outer die 31 in its longitudinal direction.

The deep drawing process with combined groove formation avoids substantially the deformation hardening that is normally induced by a pure stamping process. Radial outwardly directed bulge formations, which are so troublesome for automatic processing, do not occur here. Furthermore, the die 27, acting from below keeps the flow of material low in the rim areas, so that even deformation hardening is greatly lowered. The predetermined burst spot 6, prepared by this process, may be manufactured with a remaining wall thickness that is substantially greater than in conventional processes. That allows greater service safety for the whole capacitor.

FIG. 7 shows the burst spot, shown axially in FIG. 6, in a radial section. The outer die 31, causing deep drawing, has a substantially broader bottom 65 formed into the outer indentation 58. The groove-like indentation 51 is shown on the inner side, ending radially outwardly at an inner bottom 67. This indentation may be formed more trapezoidally like that shown in FIG. 7. In this embodiment, the bottom 67 protrudes over the inner diameter of the inner wall 2 into the wall thickness proper of can housing 1. The breadth of the inner bottom 67 is two to four times smaller than the breadth of the outer bottom 65.

FIG. 8 shows a radial section of the predestined burst spot 6 as obtained by use of the device shown in FIG. 9.

The device according to FIG. 9 includes a holding mandrel 95 constructed like the aforedescribed mandrels. The holding mandrel 95 is distinguished, though, from the other embodiments by the lower groove die 97. This groove die 97, disposed centrally in the longitudinal direction of groove 96, has a trapezoidally-shaped tapered bezel head 102. The upper end of the bezel head 102, formed as a straight narrow plane has, seen axially, in other words from the narrow side, a breadth in the range of between 0.1 to 0.2 mm. While the groove 96 has an approximate breadth of 0.3 mm, the groove die 97 raising from the groove bottom 99 by about 0.1 to 0.2 mm measured from the groove bottom radially to the groove opening. A height of 0.1 mm is preferred.

The outer die 98, acting from above, is formed as a groove die in the embodiment according to FIG. 9. Its cutter head 103, pointing at its lower end towards the groove 96, is broader than the lower cutter head. The breadth of the cutter head 103, viewed in axial direction, depends on the wall strength of the can housing and the meterial used. It will be a little larger than the breadth of the lower cutter head 102 and amounts to approximately 0.4 mm. Breadths in the region between 0.15 mm to 0.5 mm depends, though, on the quality of the material and wall strengths and may also be used. The upper groove die 98 is at its end trapezoidally-shaped like the lower groove die 97. In this device the groove edge 100, which rungs into the circumferential circle 104 of the holding mandrel 95, or the groove height 101 respectively, protrudes over the central lower cutter die 97 by about one to three times its height.

The predetermined burst spot 6, preparable by this device, is shown in radial section in FIG. 8. Corresponding to the device also, the outer indentation 81 is formed in the middle region as outer groove 83. The inner groove bottom 84 of the inner groove 82, caused by the lower groove die 97, lies opposite to the groove bottom 85 of the outer indentation 81. The bottom of the outer groove 83 is, opposite to the display according to FIG. 8, normal and corresponding to the breadth of the cutter head 103 of the device, broader than the bottom of the inner groove 82. Despite occurring material bulges 85 at both sides of inner groove 82, no substantial creep of the material occurs during manufacture so that deformation hardening and flow hardening are substantially prevented. It is important in this embodiment of the predetermined burst spot according to FIG. 8 that the neutral middle plane 80 of the cup wall comes to lie approximately in the middle of the remaining wall thickness 89 between the bottoms of the inner groove and the outer groove before deep drawing at the end state of the deep drawn and groove can housing. The approximately straight running bottoms form in the longitudinal middle of the wall weakening a uniformly strong remaining wall, which serves as the predestined burst spot. This predestined burst spot 6, prepared by deep drawing and two side grooving shows a well definable, relatively strong remaining wall thickness of approximately 0.12 mm. Material hardening in the edge areas of the cup housing caused by flow of the material or deformation processes may be substantially neglected.

The bottom of inner groove 82 lies in this embodiment slightly radially offset relative to the inner wall 2 of the can housing 1, which is caused by the height of the groove die 97. The bulges 86 at both sides of the inner groove 82, formed by deep drawing, protrude by about 0.1 to 0.3 into the inner space of the can housing and, considering the fluting present in the wall of the can housing, do not cause any problems. By this embodiment a predetermined burst spot, lying within the drawing area 88 of about 1.5 mm breadth, is obtained with almost constant wall thickness. The originally neutral middle plane 80 of the can wall obtains by this method of preparation an only slightly curved shape, thereby contributing to the strength of the can housing but also to a good placement of the predetermined burst spot.

FIG. 10 shows another embodiment of the groove die. The groove die 110 protrudes wedge-shaped in groove 96 with its wedge point 111 pointing upwardly. The wedge point 111 may end about 0.15 mm below the outer radius of the holding mandrel 95. The breadth of the groove die amounts preferably to about 0.7 mm at a groove breadth of about 1.5 mm and a groove depth of about 1.2 mm. The deep drawn head 113 of the outer die 112 has in an axial view a square area directed towards the groove die 110, being 0.5 mm broad and which turns with a curved broadening region into the upper main part of the outer die 112. This device serves for the production of a predetermined burst spot 6 that is a wedge-shaped groove on the inside.

By using the device according to FIG. 10, the can housing 1 according to FIG. 7 or 8 would have at the predetermined burst spot 6 a wedge-shaped inner groove so that it could be named also as provided with a lateral groove valve 6.

FIG. 11 shows schematically the complete device, where the holding mandrel 12 is mounted by a rod-like holding device 19 and a fastening base 20, for instance, and is solidly installed upon a work bench or working plane. In order to better define one embodiment of the predetermined burst spot 6, the can housing 1, pulled upon the holding mandrel 12, is shown in section. In FIG. 11, the outer die 31 is already lifted again after the deep draw process so that the can housing 1 with the predetermined burst spot 6 may be pulled off the holding mandrel.

Figure 12:
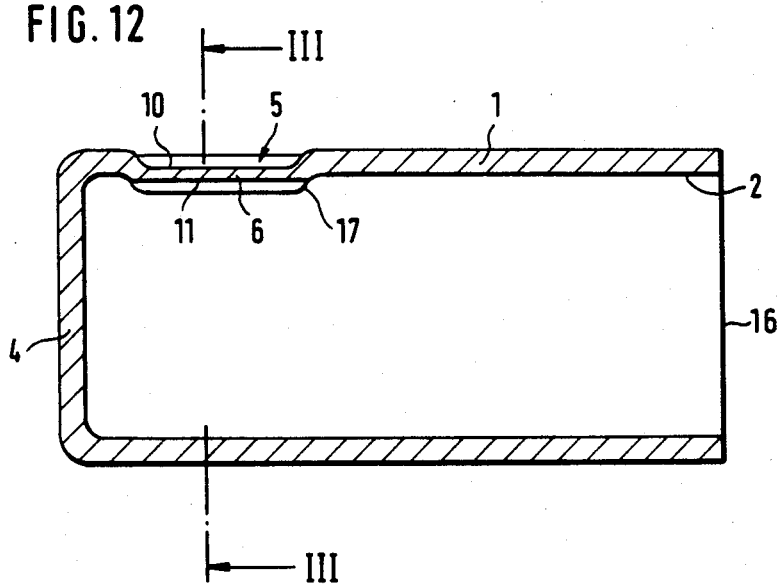
FIG. 12 is an axial sectional view of a capacitor can housing prepared by the device according to FIG. 10 in an axial section of the predetermined burst spot.
Figure 13:
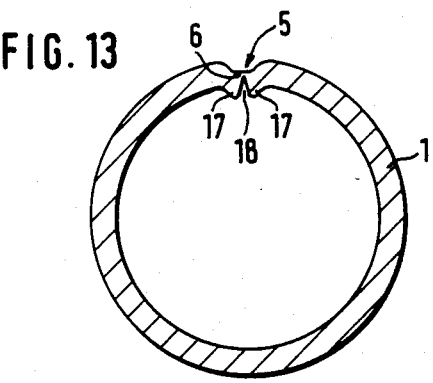
FIG. 13 is a radial sectional view of the can housing according to FIG. 12 taken along the line III—III in FIG. 12.

The can housing 1, shown in axial section in FIG. 12 and in radial section in FIG. 13 as taken along the cutting line III—III in FIG. 12, whose predetermined burst spot may be prepared with the aid of a device according to FIG. 10, differs basically from the can housing according to FIGS. 1 and 2 by the fact that the can wall in the deep drawn region 5 is also slid from inside outwardly by the inner groove die 110 and its wedge point 111. As recognizable in the radial section according to FIG. 13, the preparation using the device according to FIG. 10 forms edge bulges 17 at both sides of a sharp wedge-shaped inner slit 18, the edge bulges 17 originating from the deep drawing process with forming ensuing parallel from radially inside. In comparison to the can housing according to FIG. 1, the strength of the remaining wall at the predetermined burst spot 6, when prepared by means of a device according to FIG. 10, may be formed stronger so that the predetermined bursting pressure also may be precisely adjusted when the remaining wall strength is more precisely set.

What I claim is:

1. A capacitor can housing comprising a can wall made of a ductile material with at least a circumferentially closed can side wall, means on said side wall defining a predetermined burst spot, said burst spot being a groove-shaped weakening of said can side wall formed by a deep drawn indentation extending inwardly of said can side wall, said burst spot having an outer indentation with a bottom surface and an inner indentation with a bottom surface, said outer indentation and said inner indentation being opposed to one another, the bottom wall of said inner indentation being disposed radially inwardly of the inner circumferential surface of said can side wall, said bottom surface of said outer indentation being circumferentially wider than said bottom surface of said inner indentation, said inner indentation having a generally wedge-shaped configuration.

* * * * *